(12) United States Patent
Sauer et al.

(10) Patent No.: US 8,684,240 B2
(45) Date of Patent: Apr. 1, 2014

(54) PRESSURE REDUCING AND REGULATING VALVE COMPRISING A TAPPING MECHANISM FOR A PRESSURE CARTRIDGE THAT CAN BE ATTACHED UNDERNEATH A RECEPTACLE COVER

(75) Inventors: Hans Peter Sauer, Mülheim-Kärlich (DE); Werner Neukirch, Andernach (DE); Günther Grittman, Eppingen-Mühlbach (DE)

(73) Assignees: Impress GmbH & Co. OHG, Seesen (DE); Diefenbacher Kunststoff GmbH, Sulzfeld (DE)

(*) Notice: Subject to any disclaimer, the term of this patent is extended or adjusted under 35 U.S.C. 154(b) by 1401 days.

(21) Appl. No.: 11/815,135

(22) PCT Filed: Feb. 1, 2006

(86) PCT No.: PCT/EP2006/050606
§ 371 (c)(1),
(2), (4) Date: Feb. 8, 2008

(87) PCT Pub. No.: WO2006/082211
PCT Pub. Date: Aug. 10, 2006

(65) Prior Publication Data
US 2008/0203118 A1  Aug. 28, 2008

(30) Foreign Application Priority Data
Feb. 2, 2005 (EP) .................................. 05002203

(51) Int. Cl.
*B65D 83/00* (2006.01)

(52) U.S. Cl.
USPC ............ 222/396; 222/394; 222/399; 222/538; 137/540; 251/14

(58) Field of Classification Search
USPC .......... 222/396, 399, 394, 538; 137/209, 848, 137/540; 251/14
See application file for complete search history.

(56) References Cited

U.S. PATENT DOCUMENTS 2,873,051 A   2/1959   Hamburg
3,039,661 A   6/1962   Wentz
(Continued)

FOREIGN PATENT DOCUMENTS

DE   1216144   5/1966
DE   2300426   7/1973
(Continued)

*Primary Examiner* — Paul R Durand
*Assistant Examiner* — Donnell Long
(74) *Attorney, Agent, or Firm* — Duane Morris LLP

(57) ABSTRACT

The invention relates to a valve unit (26) comprising a cartridge and valve holder (1), which has means (6) for connecting the same to a cartridge protective housing (3), means (7; 36, 49) for sealingly fastening the same in a hole (10) that is provided for this purpose in a liquid receptacle (11) as well as a lateral, continuous hole (20), an internal housing (4), which is mounted in the cartridge and valve holder (1), in which a tapping tip (8) and a pressure-reducing valve unit (13, 14, 15, 16, 17, 18) are located at the end of the internal housing (4) facing the cartridge protective housing (3), wherein the pressure-reducing valve unit has a pressure-regulating chamber (13), wherein the pressure-regulating chamber (13) encompasses a connection to the interior of the liquid receptacle (11) via a continuous hole (19) in the internal housing (4) and the lateral, continuous hole (20) in the cartridge and valve holder (1), which [connection] is protected or can be blocked by a non-return valve. The unit forms a valve along with the cartridge protective housing and a cartridge that is located therein, which [valve] can be incorporated into a liquid receptacle, e.g., a 5-L keg of beer, in order to maintain a pressure level in the receptacle which ensures tapping of a fresh tasting, highly carbonated beverage even at a low filling level while using little space outside the receptacle.

17 Claims, 7 Drawing Sheets

(56) References Cited

U.S. PATENT DOCUMENTS

Figure 1:
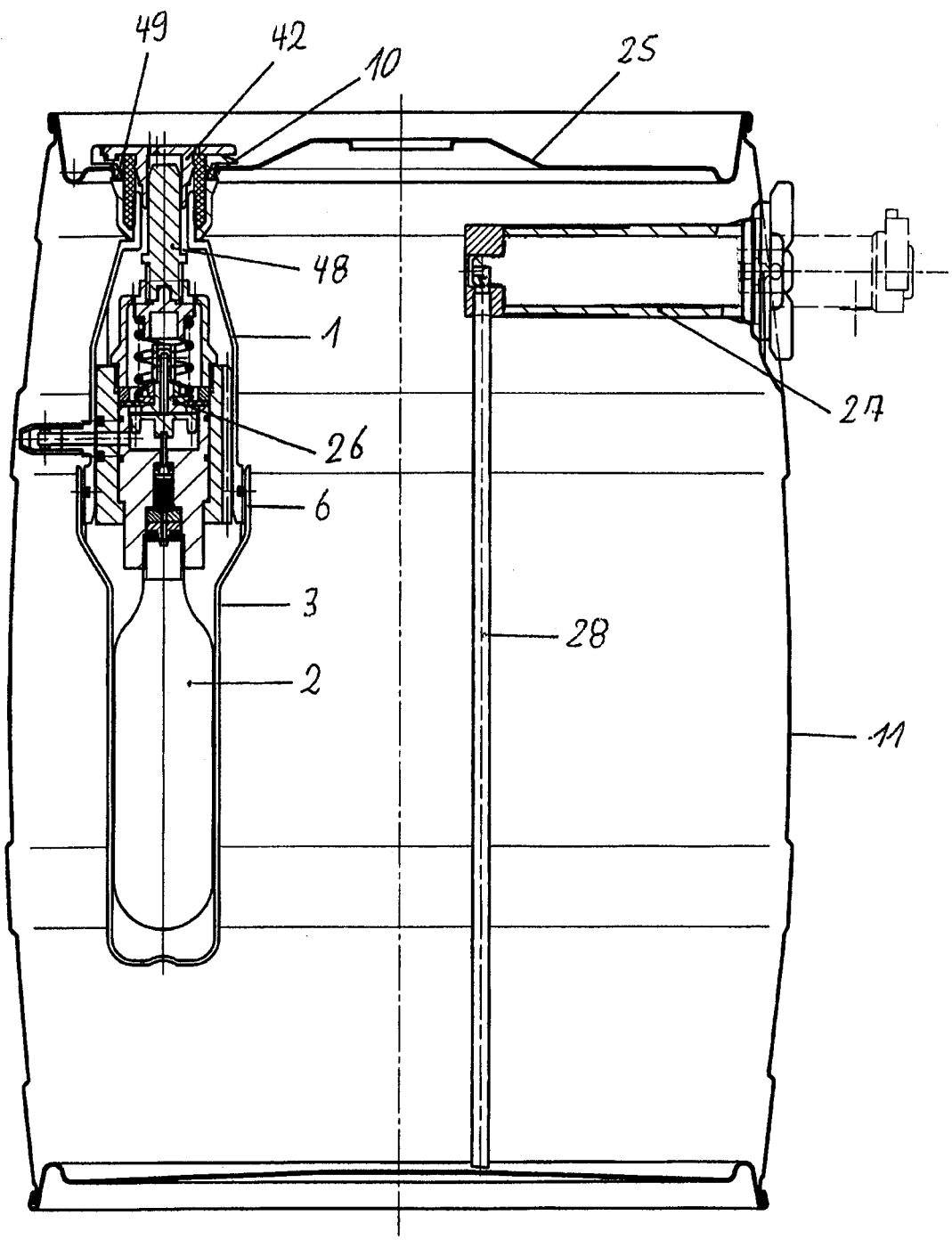

| | | | |
|---|---|---|---|
| 3,127,059 A | | 3/1964 | Lawrence, Jr. |
| 3,134,520 A | | 5/1964 | Wentz |
| 3,239,101 A | * | 3/1966 | Wilson .................. 137/209 |
| 3,327,899 A | | 6/1967 | Reynolds .................. 222/5 |
| 3,352,456 A | | 11/1967 | Swineford |
| 3,679,104 A | * | 7/1972 | Giroud .................. 222/396 |
| 3,897,831 A | | 8/1975 | van der Lely |
| 4,370,997 A | * | 2/1983 | Braithwaite et al. ....... 137/116.3 |
| 4,572,390 A | | 2/1986 | Grittmann |
| 5,363,207 A | | 11/1994 | Yoshihara |
| 5,894,869 A | | 4/1999 | Mussack .................. 141/19 |
| 6,412,668 B1 | | 7/2002 | Vlooswijk |
| 2004/0050880 A1 | | 3/2004 | Fraser-Easton |
| 2009/0090741 A1 | | 4/2009 | Oberhofer |

FOREIGN PATENT DOCUMENTS

| | | | |
|---|---|---|---|
| DE | 3345619 | 6/1985 | |
| DE | 29822430 | 4/1999 | |
| DE | 198 25 929 | 6/1999 | ............... B67D 3/04 |
| DE | 198 35 569 | 2/2000 | ............... B67D 3/04 |
| DE | 199 52 473 | 5/2001 | ............ B65D 51/16 |
| DE | 20206874 | 7/2002 | |
| EP | 0349053 | 6/1992 | |
| EP | 04 01 4958.5 | 6/2004 | |
| EP | 1642862 | 2/2008 | |
| JP | 05/296397 | 11/1993 | ............... F17C 7/00 |
| JP | 03125099 | 1/2001 | |
| WO | WO 89/00544 | 1/1989 | ............. B67D 1/04 |
| WO | WO97/16350 | 5/1997 | |
| WO | WO00/67628 | 11/2000 | |

* cited by examiner

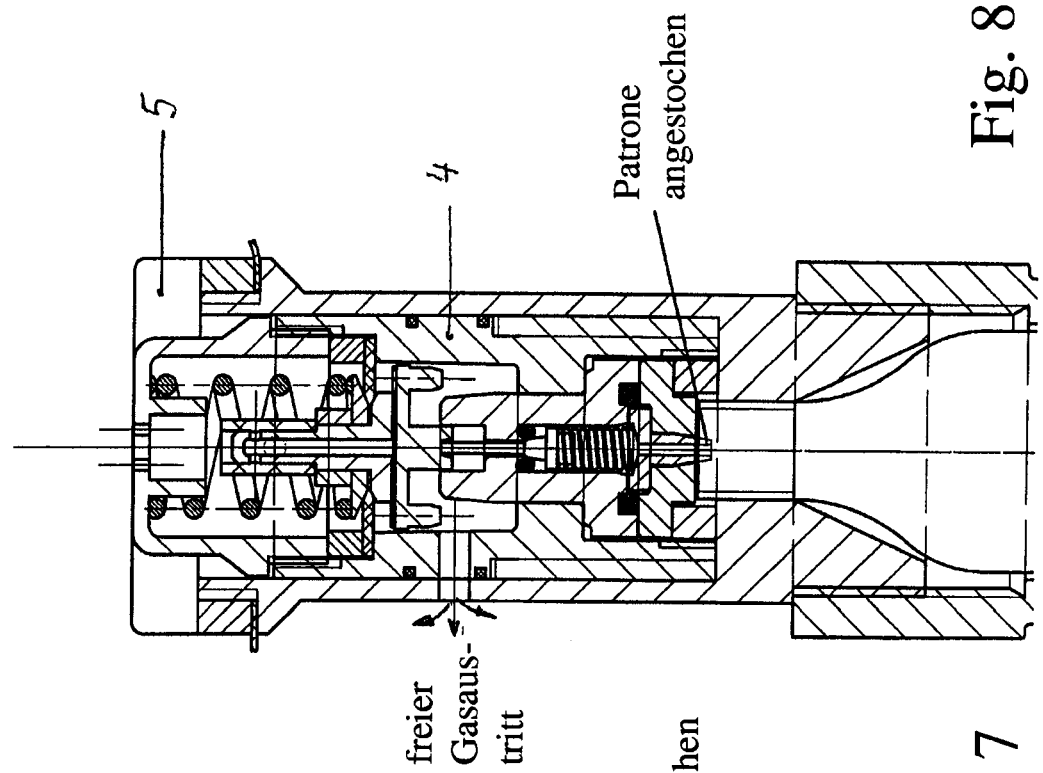
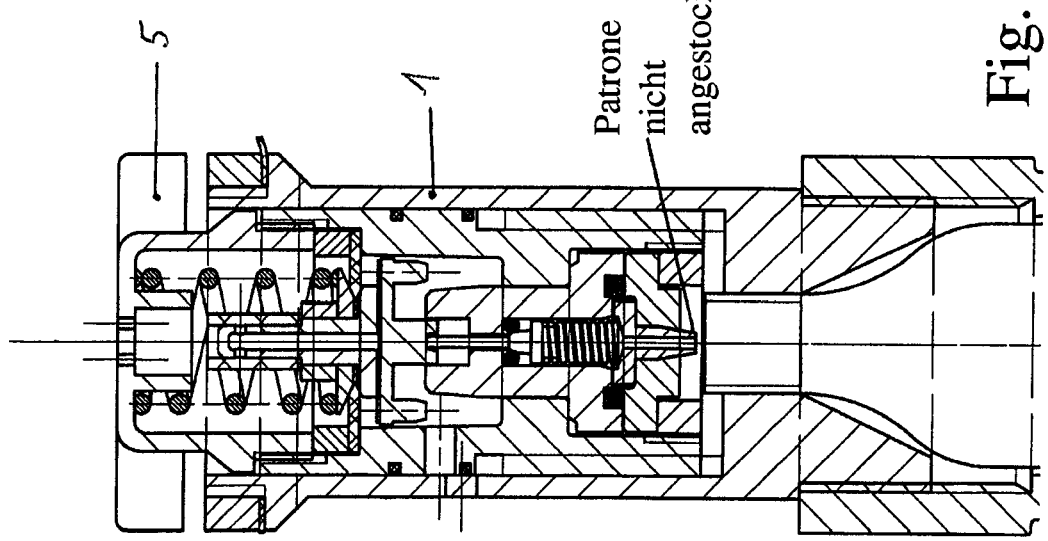
Fig. 7
Fig. 8

PRESSURE REDUCING AND REGULATING VALVE COMPRISING A TAPPING MECHANISM FOR A PRESSURE CARTRIDGE THAT CAN BE ATTACHED UNDERNEATH A RECEPTACLE COVER

The present invention pertains to a pressure-reducing and -regulating valve provided as a disposable part, which has a tapping tip. The valve cooperates during use with a pressurized gas cartridge, e.g., a carbon dioxide cartridge, in order to maintain the gas pressure in a receptacle, e.g., in a liquid receptacle, such as a large or small keg of beer, in such a way that, regardless of the liquid still present in the receptacle, a gas pressure is present, which is sufficient, on the one hand, to tap a beverage even with relatively small amount of liquid remaining in the receptacle, and which, on the other hand, keeps the beverage to be tapped fresh. Moreover, maintaining such a gas pressure makes it possible to arrange the tapping fitting at any height. In addition, this valve may comprise one or more other units: At least one safety valve unit may be provided in order to release gas into the environment in case of an erroneously excess pressure that has increased to values that are too high. A non-return valve unit may prevent the pressure prevailing in the can and, with this, liquid from reaching the valve area. Of course, the valve according to the present invention may also be used for other purposes.

Beer is now offered, among other things, in small metal kegs of, e.g., 5 L capacity. These kegs have in a small lower area of the side wall an integrated tap, which is pushed into the receptacle before the first use. A vent valve, which usually sits in the fill hole of the can, is located in the cover.

When the beer in such a keg runs low, it begins to become stale, since the pressure in the receptacle drops. To counteract this, a vent valve has already been developed, onto which a tapping fitting with a carbonic acid cartridge can be placed as needed. Such a valve is described, e.g., in DE 199 52 473.

The carbonic acid tapping devices known up to now are multi-use devices. The tapping fitting is rigidly clamped to the keg by means of a clamp, and the gas cartridge located outside, which is a CO2 cartridge, is tapped by means of the cartridge holder. The cartridge is moved ["beweg" in German original is a typo for "bewegt"—Tr.Ed.] to the tapping tip of the valve. After each use, the device must be cleaned at a cost. Moreover, it is large and cost-intensive, so that a person, who would like to tap a keg of beer in the size mentioned only occasionally, will be thinking precisely about whether the purchase is worth it.

The present invention intends to create help here and to provide a valve unit for a tapping system, with which, on the one hand, the pressure within the receptacle can be maintained at a level even at a low beverage filling level, which ensures the tapping of fresh tasting, highly carbonated beer or the like, which, however, on the other hand, takes up little space outside of the receptacle.

The present invention accomplishes this object by providing a valve unit according to claim 1, and in particular in the embodiments of claims 2 through 5 and 6 through 8. Additional elements of the valve unit can be provided according to claims 9 through 17.

The valve unit according to the present invention is suitable, in combination with a pressure source, e.g., a carbon dioxide cartridge, as a disposable part for especially smaller receptacles containing carbonated beverages or the like and here quite particularly for beer. According to the present invention, a valve with the following functions is provided: It shall be able to tap the pressure source for maintaining the pressure in the receptacle, to reduce the pressure thereof optionally in a suitable manner, and to regulate the pressure within the receptacle. In a preferred embodiment of the present invention, the valve unit shall additionally be able to perform a safety valve function, if the pressure in the valve unit, partly also in the receptacle, should become too high.

The valve according to the present invention can be attached to a can in combination with a usual tap, for example, a disposable tap, as it has become known from DE 198 35 569 or DE 198 25 929 A1, but in particular with an arrangement according to EP 04 01 4958.5. In this case, it can be inserted into a central bunghole or fill hole; however, it is preferably inserted eccentrically into the front side cover of the can so that the tap, which may be located relatively far above in the side wall of the receptacle according to EP 04 01 4958.5, is not hindered by the cartridge protective sleeve, which is connected to the valve unit and which projects inwards, or vice versa. However, the latter is not mandatory. The tap may, as needed, be equipped with a compensator system, with which the tapping pressure can be reduced and finely adjusted in relation to the inside pressure.

According to the present invention, it is possible in a first embodiment of the present invention that the gas cartridge located therein is already tapped during the mounting of the valve unit in the cover and its assembly with the cartridge protective housing. In this case, gas escaping from the cartridge advances up into a pressure chamber, wherein the pressure building up in this case is used for this purpose to seal this chamber via a valve (in the form of a reducing valve) until the valve unit is actuated. The actuation takes place, as needed, from outside in such a way that the said sealing valve is opened against the force that the gas pressure exerts, such that gas from the pressure chamber can enter a pressure-regulating chamber. A spring system ensures that the pressure ratios in the two chambers are subsequently balanced out in relation to one another in such a way that a pressure of ca. 1.0 bar to 1.5 bar is set in the interior of the valve unit. If this pressure is reached, the reducing valve closes again. If a higher pressure prevails in the interior of the valve unit than in the internal chamber of the liquid receptacle, gas can escape from the valve unit into the receptacle interior. If, however, the pressure in the interior of the liquid receptacle is higher than in the valve unit, a non-return valve prevents liquid from the main chamber of the receptacle from entering the pressure-regulating chamber of the valve unit.

As an alternative, in a second embodiment of the present invention, the tapping of the cartridge can be brought about from outside only at the point in time, from which a compensation of the drop in pressure in the liquid receptacle is needed. An activation of the valve unit then preferably at the same time brings about the tapping of the cartridge and the setting of the sealing valve to the above-mentioned pressure balance. It is possible to provide a non-return valve in this embodiment as well. Instead of this or in addition, however, provisions may be made for the cartridge to be tapped via a sleeve-like internal housing, whose rotary movement leads to an axial movement of a tapping tip connected to it in the direction of the opening of the gas cartridge. In this case, the presence of a rotatable internal housing in the outer housing of the valve unit may for this purpose be used, when the gas cartridge is tapped or was tapped, for gas to be able to escape from the pressure-regulating chamber, for example, because holes in the side wall of the internal housing and in the outer housing of the valve unit come to lie above one another only after this rotary movement, so that gas can escape into the interior of the receptacle.

The valve unit according to the present invention may be attached sealingly in a corresponding hole of the liquid receptacle in any manner. This hole is preferably found eccentrically in the cover area of the liquid receptacle. For example, the upper end area of the valve holder of the valve unit may be connected to a vent valve plug, which, besides the attaching and sealing function, has, moreover, actuating means for transmitting a force into the interior of the valve unit, which opens the sealing valve of the pressure chamber, as mentioned above, against the gas pressure, when this vent valve plug is used in combination with the above-mentioned first embodiment of the present invention. Instead of this, it may also be provided with means, which make possible the tapping of the gas cartridge according to the said second embodiment of the present invention only after the complete mounting and sealing of the liquid receptacle. The vent valve plug may have dimensions and sealing surfaces/locking claws in such a way that it is used as a sealing plug for the valve unit according to the present invention, with which this is anchored in the hole of the liquid receptacle. Instead of using a vent valve plug, the valve unit may also be inserted directly into the hole of the liquid receptacle by means of sealing means.

At any rate, it is advantageous if the valve unit according to the present invention has at least one safety system, by means of which a too-high pressure in the pressure-regulating chamber can be reduced and can be discharged outside into the surroundings of the liquid receptacle. In the case of the second embodiment of the present invention, this system may also dissipate excess pressure in the liquid receptacle. If a non-return valve is present, this is not necessary, however. Moreover, an additional, second safety system may be desirable, which, in case of sealing problems in the immediate vicinity of the tapping tip, leads an undesirable excess pressure out of the chambers present there and to the outside.

Figure 2:
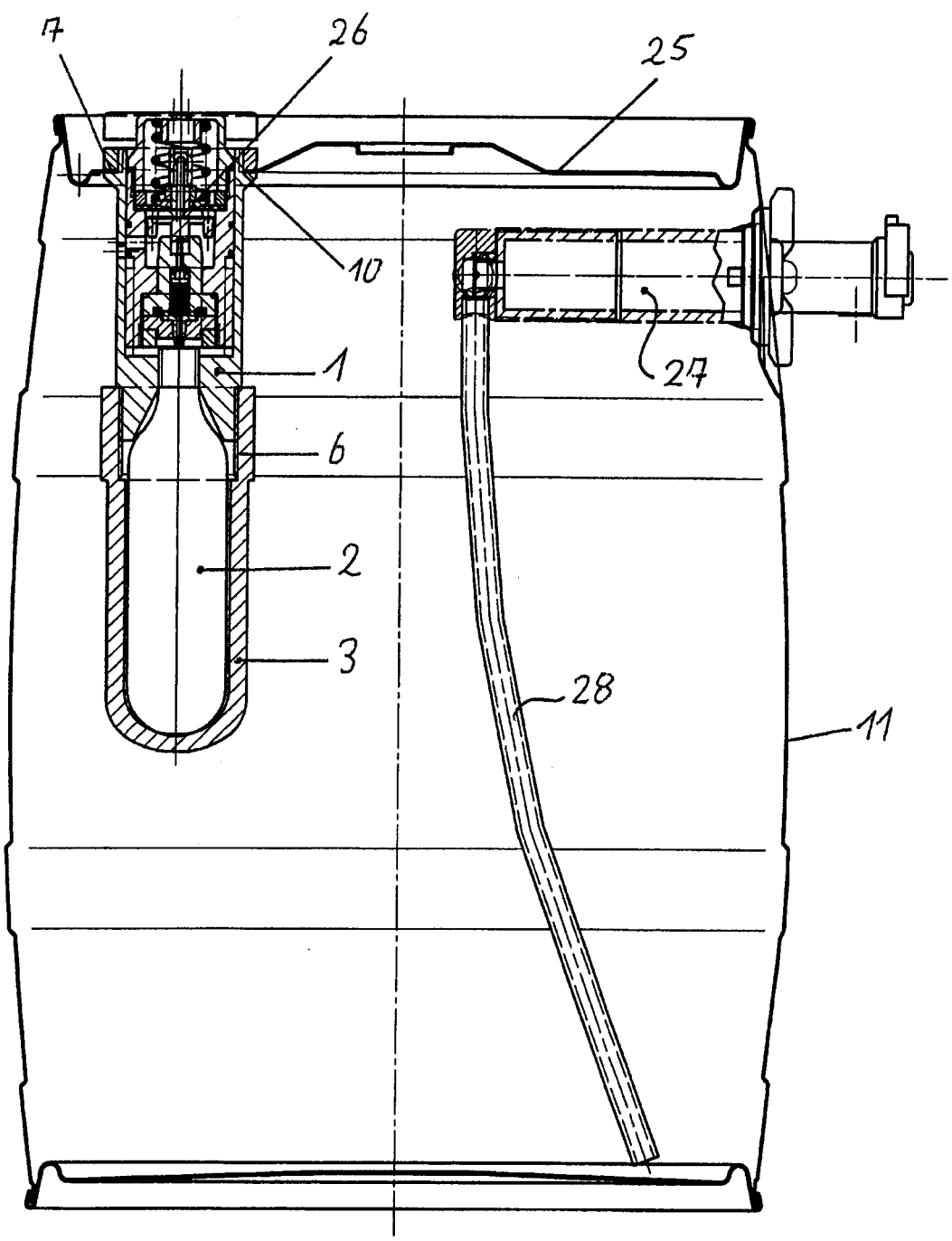
Figure 3:
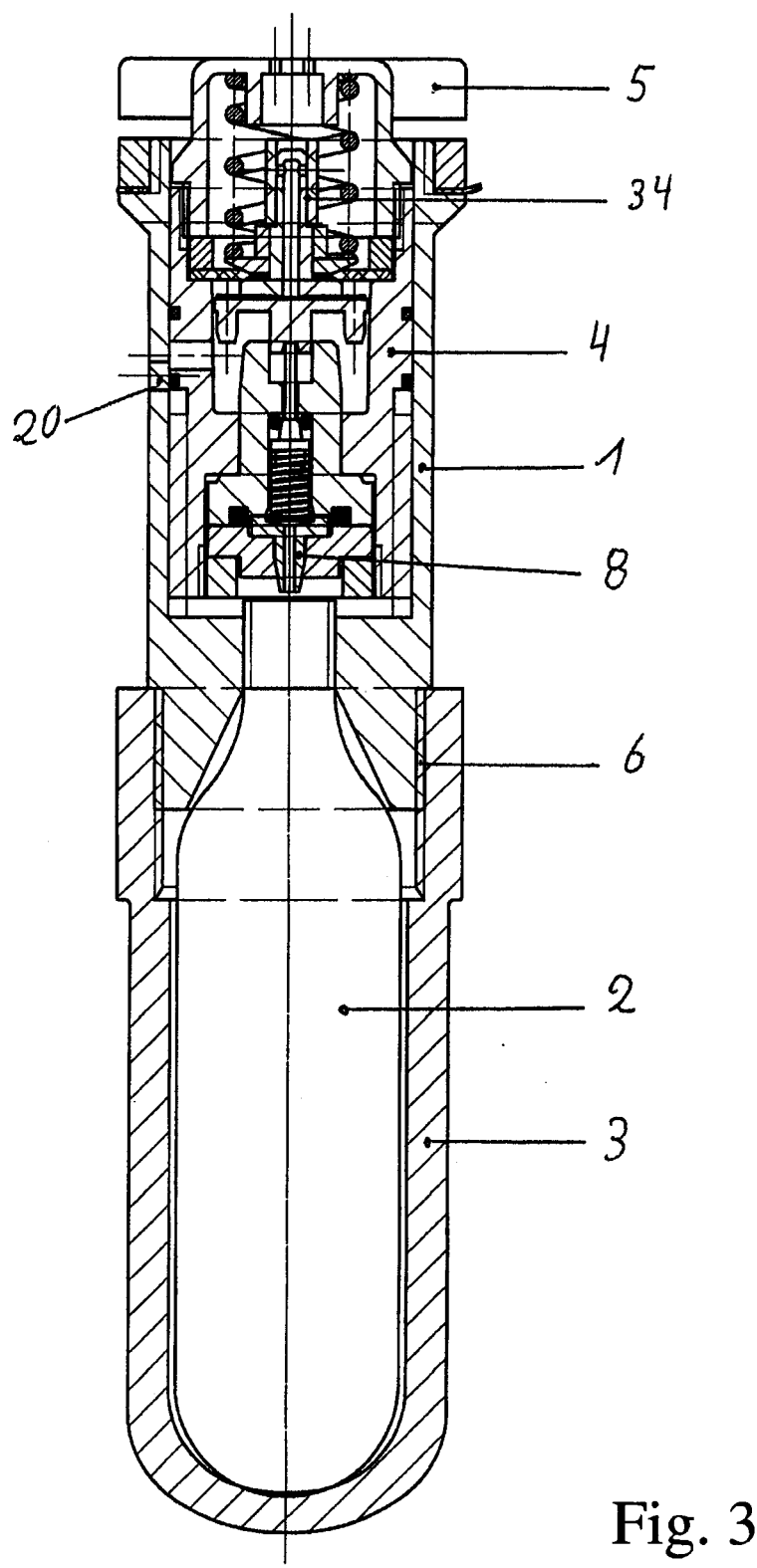
Figure 4:
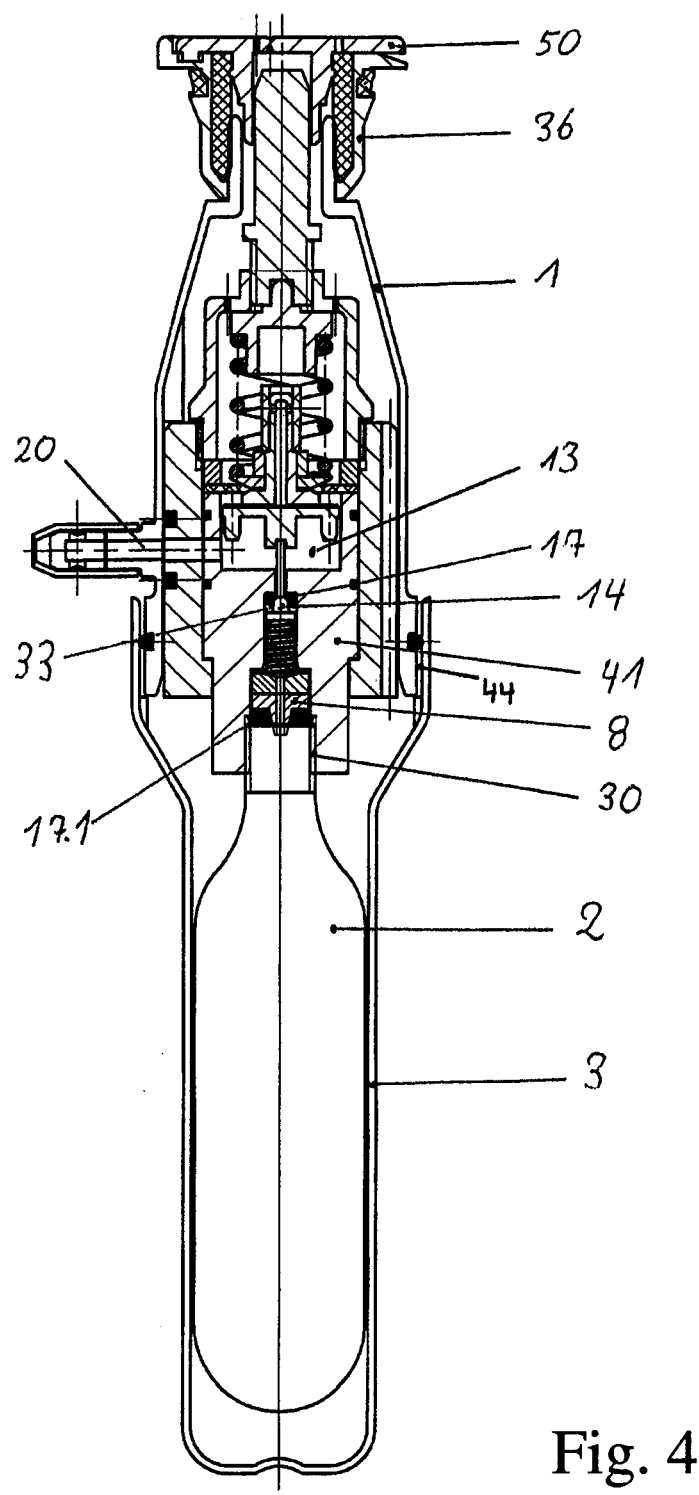
Figure 5:
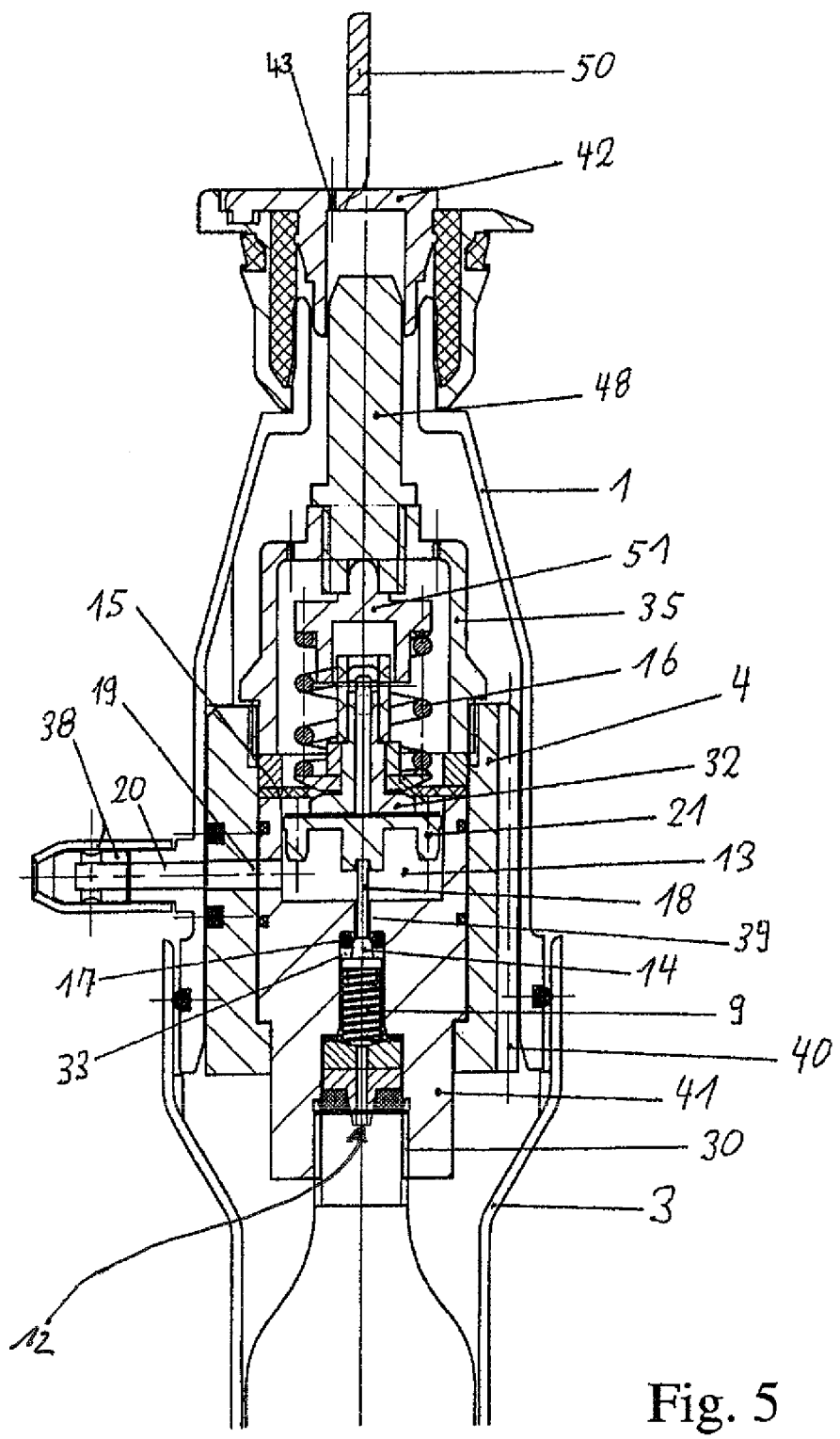
Figure 6:
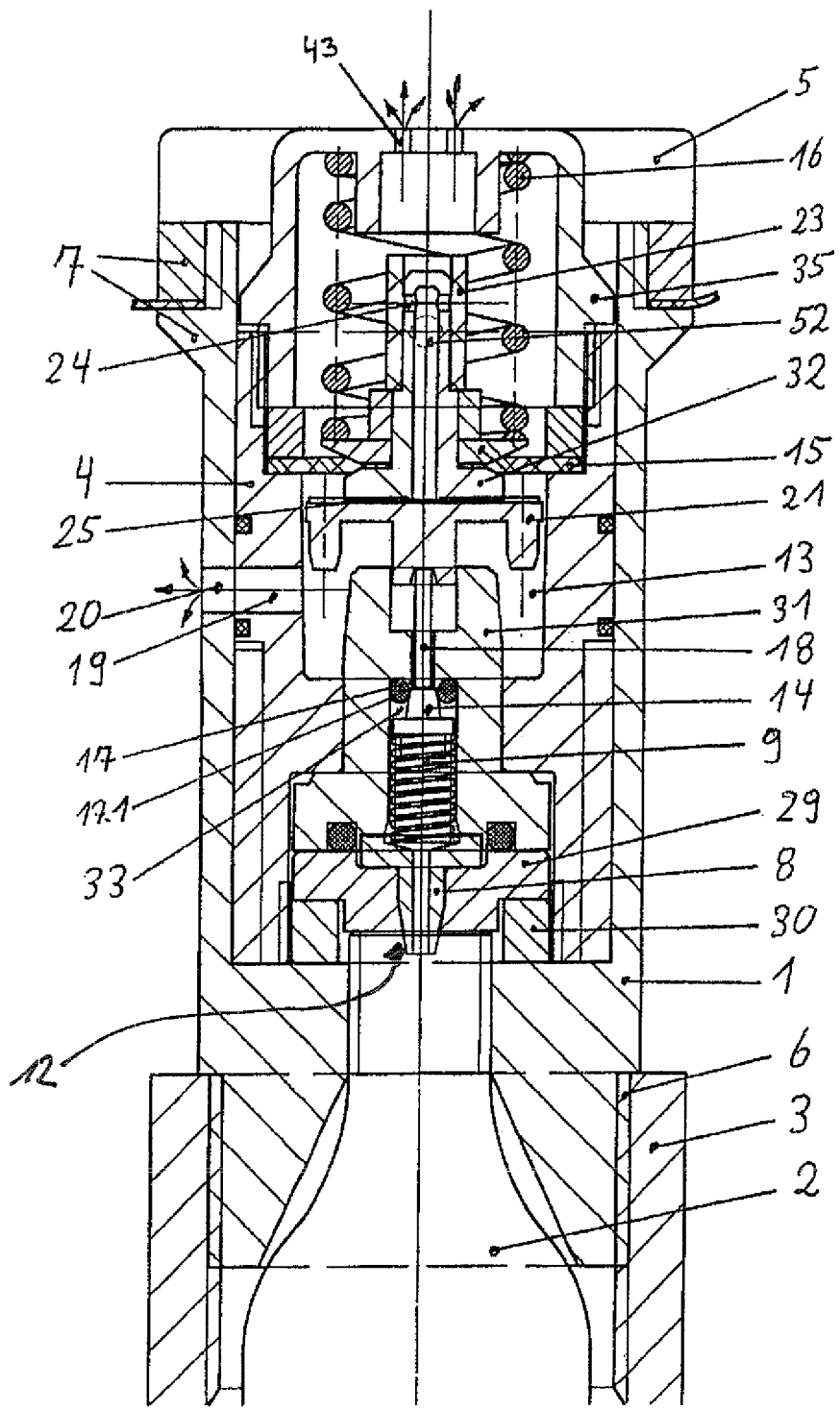

The present invention shall be explained in detail based on the figures, in which:

FIG. 1 shows a liquid receptacle with a first embodiment of the valve unit according to the present invention, which valve unit is connected to a CO2 pressure cartridge located in a cartridge protective housing 3 and is mounted eccentrically in the cover of the receptacle, so that enough space remains for the arrangement of a tap with feed tube, FIG. 2 shows a second embodiment of the valve unit according to the present invention in a view similar to FIG. 1, FIGS. 3 and 4 show general views of the various parts of the embodiments of the valve unit shown in FIGS. 2 and 1, which may comprise the same according to the present invention, wherein each shows a state after the mounting and the sealing of the receptacle filled with liquid, but before the actuation of the valve unit, FIG. 5 shows the valve unit according to FIG. 1 in the activated state, FIG. 6 shows details of the embodiment of the valve unit according to the present invention shown in FIG. 2, and FIGS. 7 and 8 illustrate the axial movement of the internal housing and of the tapping tip of the embodiment shown in FIG. 2, wherein FIG. 7 shows the valve unit in a position, in which the tapping tip has still not broken through the seal of the gas cartridge, but has already moved a little bit downwards in the axial direction, and FIG. 8 shows the valve unit in the stopped position, in which the tapping tip has already broken through the seal of the gas cartridge.

Identical reference numbers are used for identical elements of all figures and embodiments.

FIG. 1 shows a valve unit 26 according to the present invention comprising a cartridge and valve holder 1, whose upper extension with locking claws meshes with a recess (outside cage) of a vent valve plug. The vent valve plug is designed in some parts analogously to the plug that has become known from DE Patent No. 199 52 473 C2. Thus, it has lateral sealing surfaces 49, with which it is anchored in the eccentric hole 10 in the cover 25 of the beverage receptacle 11, as well as a rotary cover 42 with tapping cover plate. The rotary cover has a centrally arranged rotary cover mount, into which a tapping screw 48 is pushed. The vent valve projects only slightly over the cover level and is not higher than the cover edge, such that it does not prevent a stacking of receptacles on top of one another.

On the inside of the receptacle, a cartridge protective housing 3 is attached at the valve holder 1, into which a cartridge 2 can be inserted. Furthermore, FIG. 1 shows the arrangement of a tap 27 with a feed tube 28. Because a sufficient pressure can always be maintained in the receptacle 11 by means of the valve unit, it is not necessary for the tap to be located near the bottom; instead, it may be mounted far above in order to make the tapping easier, as described in EP 04 01 4958.5. Here, the liquid is fed via a feed tube 28.

FIG. 2 shows an alternative valve unit 26, which is likewise inserted into a round, eccentric hole 10 in the cover 25 of the receptacle 11. Here as well, the valve unit projects only slightly over the cover level, because it sits rigidly with its outer housing, the valve holder 1, and sealingly in the hole 10 via a sealing means 7. The stopping can take place in the known manner. This may be, e.g., by means of a threaded ring, which meshes with an external thread of the cartridge and valve holder 1, in such a way that the wall of the receptacle cover between this ring and a projection of the cartridge and valve holder 1 can be clamped. Instead of this, the valve holder 1 may have two peripheral flanges or locking wedge rings, between which a sealing ring is located. When the valve holder is locked in the hole of the receptacle that is provided for this purpose, the edges of this hole come to lie on the seal and are held by the flanges or the locking wedge rings.

FIG. 3 shows the valve unit 26 according to the present invention according to FIG. 2 in combination with a cartridge protective housing 3 with cartridge 2 located therein in the assembled state after mounting in the liquid receptacle cover. The cartridge and valve holder 1 has a tapping lever 5 with an original safety mechanism, a safety valve 34, a pressure-reducing valve located in an internal housing 4 and a tapping tip 8. The tapping tip is still located above the gas cartridge tapping point; only when an escape of gas in the liquid receptacle is desired in order to compensate the drop in pressure caused by the tapping of a beverage, it [tapping tip] is lowered by actuating the tapping lever up into the tapping point, as described in detail in the explanations of FIGS. 6 and 7.

FIG. 4 shows the valve unit shown in FIG. 1 with more precision in all its main components. One recognizes the valve holder 1, which is enclosed by the vent valve plug 36 and is connected to a cartridge holder 3, into which the cartridge 2 is inserted, by external force or via locking claws 44. When mounting, the gas cartridge 2 is pushed into the metal core 41 by means of a thread 30 and is tapped by the tapping tip 8 of the valve unit. The gas escaping from the gas cartridge reaches a pressure chamber 33 by means of a channel in the tapping tip, but is prevented from flowing further due to the cooperation of the valve lifter head 14 with the sealing surfaces or seats 17. A seal 17.1 seals the tapping hole and tapping tip against the metal core 41 and the thread 30.

By actuating the tapping cover plate 50, gas from the pressure chamber 33 reaches the pressure-regulating chamber 13, as is shown in detail in FIG. 5. The tapping cover plate 50 is lifted for this purpose and rotated; the tapping screw 48, which is located in frictional contact connection in an internal recess of the rotary cover 42, is correspondingly also rotated. A screw thread 37, which is located in the lower area of the tapping screw on the outside thereof, meshes with a corresponding threaded part in the inside neck area of the regulator seal 35. Therefore, the rotary movement of the tapping cover plate at the same time brings about an axial movement of the tapping screw 48 in the direction of the gas cartridge. For this purpose, the thread may have, for example, such a pitch that the rotary cover 42 needs ca. 3 rotations until the tapping screw rests against the regulator seal 35. A compression spring (coil spring) 16, which tensions a fitting element 51 against the tapping screw 48, is arranged in the interior of the regulator seal. If the tapping screw rests against the regulator seal, it exerts a high force onto a spring disk held by a diaphragm holder 32 via the fitting element and the compression spring 16. The diaphragm holder 32 presses inwardly against a regulator plate 21, which limits the pressure-regulating chamber 13 in the upward direction. The regulator plate transmits the pressure to a valve element from the valve lifter 18 and valve lifter head 14, which then moves in the axial direction away from the seal 17 downwards. Consequently, gas may reach the pressure-regulating chamber 13 via a continuous channel 39 from the pressure chamber 33.

The pressure-regulating chamber 13 is, as has been mentioned, limited in the upward direction by the regulator plate 21 and otherwise by the metal core 41 and the valve seal 14, 17. The internal housing 4, which is per se held by the valve holder 1, extends around the metal core. The pressure-regulating chamber 13 is connected to the interior of the liquid receptacle 11 via lateral, continuous, aligned holes both in the metal core 41 and in the internal housing 4 and in the valve holder 1. In order to prevent gas or liquid from the main chamber of the liquid receptacle from entering the pressure-regulating chamber 13 in case of unfavorable pressure ratios, the lateral hole in the valve holder 1 is embodied as a non-return valve 38.

The valve unit according to the present invention is, as mentioned above, set at a pressure of ca. 1.0 bar to 1.5 bar (prestressing of the compression spring 16). If this pressure is reached, the valve lifter head 14 is sealed by means of the compression spring 9 against the pressure of the compression spring 16. If the internal pressure of the receptacle is over 1.0 bar to 1.5 bar, the non-return valve 38 remains closed. If the internal pressure of the receptacle drops below this value, the valve opens, and gas, e.g., $CO_2$, flows until a pressure balance is reached.

FIGS. 6 through 8 show the details of a specific valve unit according to FIG. 2 with safety valve; the cartridge protective housing 3 connected to the cartridge and valve holder 1 can only be partly seen. The connection between the two parts is identified with reference number 6; this [connection] may be embodied in any way, e.g., as a screw thread.

In its upper area on the outside, the valve unit has means 7, with which the cartridge and valve holder 1 can be held sealingly and tightly in the hole of the liquid receptacle. Otherwise, the cartridge and valve holder is preferably embodied essentially as a continuous tube with circular cross section, which has a lateral hole 20, which can communicate with a hole 19 of the internal housing 4. The internal housing 4 is attached both rotatably and displaceably in the axial direction against the cartridge and valve holder 1 via a thread. In its starting position, in which a cartridge located in the cartridge protective housing is not yet tapped (see also FIG. 7), it is located in such a position that the hole 19 is not connected to the hole 20 of the cartridge and valve holder 1. As a result, no liquid is able to enter the valve before putting into operation. The internal housing 4 is attached at the cartridge and valve holder 1 is in such a way that a rotary movement at the same time brings about a displacement of the internal housing inwardly in the direction of the cartridge tip (see also FIG. 8). By means of a handle or a strap 5 on the outside of the valve unit, it can be twisted from the outside of the liquid receptacle, wherein the tapping tip 8, which is arranged in its end area directed inwardly by means of a tapping disk 29 and a threaded ring 30, is moved inwardly in the axial direction until it taps the cartridge 2.

A channel, through which gas from the cartridge can escape into a chamber 33, runs through the tapping tip. By means of a compression spring 9 in this chamber, a valve lifter is tensioned against a valve seat 17; this valve seals the chamber 33 against a continuous hole, which is connected to a pressure-regulating chamber 13. This [chamber] is limited laterally by the internal housing, but has a connection to the outside via the hole 19, which communicates with the hole 20 in the cartridge and valve holder after the displacement of the internal housing 4 in the direction of the cartridge tip, such that there is a connection of the pressure-regulating chamber 13 to the main chamber of the liquid receptacle after tapping the cartridge.

On its side opposite the valve unit 14, 17, i.e., in the outward direction, the pressure-regulating chamber is limited by a spring disk 15, which is held sealingly at the internal housing. In the center, it is held by a diaphragm holder 32, via which it is prestressed by means of a compression spring 16 held by a regulator seal 35. The diaphragm holder 32 presses inwardly against a regulator plate 21, which transmits the pressure to a valve lifter 18, which is arranged in a regulator sleeve 31. The piston 18 transmits the pressure to the head 14 of the valve lifter. If the pressure drops in the liquid receptacle and thus in the pressure-regulating chamber below a value settable via the compression spring 16, then the countertensioning, which presses the spring disk in the direction of the compression spring 16, drops to a value, beyond which the pressure exerted by the compression spring 16 becomes so high that the piston 18 presses the head of the valve lifter downwards and gas can escape from the chamber 33 until a pressure has again built up in the pressure-regulating chamber 13, which presses the spring disk sufficiently far against the compression spring 16 that the piston 18 returns to its starting position.

For safety technical considerations, it is preferred that the internal housing is no longer moved back into its starting position after tapping the cartridge. This can be achieved in that a spring-mounted bolt is provided in the internal housing, which locks into place in a hole in the valve holder 1 in the final position.

All embodiments of the present invention have in common the fact that a safety system can be provided, which prevents the pressure in the pressure-regulating chamber 13 from being able to increase beyond a predetermined value, e.g., because of a malfunction of the reducing valve. For this purpose, a hole 52, which extends within the interior of the compression spring 16, is located in the diaphragm holder 32. The diaphragm holder 32 has, in alignment with the tubular interior 52 provided with holes, a hole, which is connected to the pressure-regulating chamber 13 via small-sized cross holes 25, which are arranged between the diaphragm holder and the regulator plate 21 or are designed as recesses in the diaphragm holder. Small holes 24 are arranged in the side wall of the diaphragm holder 32 near its outer end. An over-pressure hose piece 23 is pushed over this end up to over the holes and seals these under the working pressures provided. If the pressure in the pressure-regulating chamber 13 increases too sharply, the gas pressure also increases in the interior of the sleeve; the gas presses against the wall of the plastic tube and causes a slit to form between the sleeve and the tube, through which the gas can escape into the spring chamber of the spring 16 formed in the regulator seal 35. From there it reaches the regulator seal 35 from same via holes. In embodiments, in which the valve unit is attached in the cover of the liquid receptacle via additional means, such as the vent valve plug 36, these means must, of course, then be equipped with holes or channels, which make possible a release of the excess pressure from the valve unit according to the present invention. Such vent holes are designated as 43 in the attached figures.

In the second embodiment of the present invention, as is shown, e.g., in FIG. 2, an undesirable excess pressure in the interior of the liquid receptacle may also be released with this safety system. In embodiments with a non-return valve between the pressure-regulating chamber 13 and the main chamber of the liquid receptacle, such an excess pressure may not even form at all in the receptacle.

In addition, a second safety system may be provided for preventing the formation of a too-high pressure with sealing problems at the tapping tip 8, e.g., in the area of the thread 30. Such a system is shown in FIG. 5. In the embodiment of this figure, gas, which escapes via the thread 30, would reach the chamber between the gas cartridge and the cartridge protective housing 3. A safety channel 40 in the internal receptacle 4 and optionally holes 43 in the rotary cover 42 lead a pressure possibly building up correspondingly in the outward direction. In other embodiments, for example, the valve unit according to FIGS. 2, 3 and 6 through 8, corresponding channels would have to be provided, in the case of this embodiment, for example, in the cartridge protective housing 3, in the valve holder 1 and optionally in the internal housing 4 of the valve holder. An increased pressure cannot form in the liquid receptacle due to the additional safety system.

The valve according to the present invention can be operated, for example, at the following pressures: Starting pressure in the gas cartridge: ca. 60 bar. Pressure in the pressure-regulating chamber: 1 to 3 bar; triggering of the safety valve at more than 3 bar overpressure.

LIST OF REFERENCE NUMBERS

1 Valve holder
2 Cartridge
3 Cartridge protective housing
4 Internal housing
5 Tapping lever
6 Screw thread of valve holder/cartridge holder
7 Outer sealing means
8 Tapping tip
9 Compression spring
10 Hole in the receptacle cover
11 Liquid receptacle
13 Pressure-regulating chamber
14 Valve lifter head
15 Spring disk
16 Compression spring
17 Sealing surface for valve lifter
17.1 Seal
18 Valve lifter
19 Lateral hole in the internal housing
20 Lateral hole in the valve holder
21 Regulator plate
23 Overpressure hose
24 Holes
25 Cross hole
26 Valve unit
27 Tap
28 Feed tube
29 Tapping disk
30 Threaded ring
31 Regulator sleeve
32 Diaphragm holder
33 Pressure chamber
34 Safety valve
35 Regulator seal
36 Valve plug
37 Screw thread
38 Non-return valve
39 Continuous channel
40 Safety channel
41 Metal core
42 Rotary cover
43 Vent hole
44 Locking claw
48 Tapping screw
49 Sealing ring
50 Tapping cover plate
51 Fitting element
52 Hole

The invention claimed is:

1. A valve unit (26), said valve unit (26) comprising: a cartridge-and-valve-supporting unit (1), an inner housing (4), a pressure reducing valve unit (13, 14, 15, 16, 17, 18) and a cartridge protective housing (3), said cartridge-and-valve-supporting unit (1) supporting a gas cartridge (2), said cartridge-and-valve-supporting unit (1) supporting said pressure reducing valve unit (13, 14, 15, 16, 17, 18), said cartridge-and-valve-supporting unit (1) comprising a connecting means (6) for connection with said cartridge protective housing (3), said cartridge-and-valve-supporting unit (1) comprising means (7,36,49) for sealing attachment of said cartridge-and-valve-supporting unit (1) into an opening (10) of a fluid container (11), said cartridge-and-valve-supporting unit (1) comprising a through-bore (20) defined within a wall of said cartridge-and-valve-supporting unit (1) and enclosed by a radially outwardly projecting cover wherein said through-bore (20) is in selective communication between (i) a hole (19) leading to a pressure chamber (33) and (ii) an outside environment;

said inner housing (4) being supported in said cartridge-and-valve-supporting unit (1), said inner housing (4) comprising an end-to-end opening (37), a movable tapping tip (8) being provided within said inner housing (4) on its end facing the cartridge protective housing (3) so as to be movable toward said gas cartridge, said pressure reducing valve unit (13, 14, 15, 16, 17, 18) being provided within said inner housing (4) on its end facing the cartridge protective housing (3), said pressure reducing valve unit (13, 14, 15, 16, 17, 18) comprising a pressure adjusting chamber (13), said pressure adjusting chamber (13) being in communication with the inside of the fluid container (11) via said end-to-end opening (37) in said inner housing (4) and said lateral end-to-end opening (20) in said cartridge-and-valve-supporting unit (1), said communication of said pressure adjusting chamber (13) and said inside of the fluid container (11) being protected or sealable by a check valve unit (38) disposed within said radially outwardly projecting cover.

2. The valve unit (26) according to claim 1, wherein said valve unit 1 is connected with said cartridge protective housing (3) by force fit or claw fasteners (44).

3. The valve unit (26) according to claim 1, wherein said inner housing (4) comprises a metal core (41) comprising a screw thread (30), into which screw thread (30) of said gas cartridge (2), that is provided within the cartridge protective housing (3) can be screwed, such that said tapping tip (8) moves toward and taps said gas cartridge.

4. The valve unit (26) according to claim 3, wherein said pressure adjusting chamber (13) is axially defined on the side of the said cartridge protective housing (3) by a tappet head (14) as well as by the upper side of said metal core (41), and on the opposing side by a membrane (15), the upper side of said tappet head (14) cooperating with an annular sealing face (17) thereby sealing the pressure adjusting chamber (13) against the pressure existing in the tapping tip, said membrane (15) being biased against the pressure adjusting chamber (13) by a spring (16).

5. The valve unit (26) according to claim 4, wherein increased pressure can be applied to said spring (16) from the outside, such that when pressure within the pressure adjusting chamber (13) decreases under a predetermined value a valve lifter (18) connected with said membrane (15) acts against and opens said valve (14, 17), until a sufficient amount of gas has entered the pressure adjusting chamber for rising up the pressure over said predetermined value.

6. The valve unit (26) according to claim 5, wherein the increased pressure is applicable on said spring (16) by turning a cap (5, 42) provided on the outside and effecting an axial movement of a tapping screw (48) in the direction of the cartridge protective housing into a position, in which said tapping screw directly or via an intermediate member (35) acts against said spring (16).

7. The valve unit (26) according to claim 6, wherein said turning cap (50, 42) is provided on the outside on a valve-ventilation plug (36), said valve-ventilation plug (36) being inserted in a sealing manner (49) within said opening (10) of said fluid container (11).

8. The valve unit (26) according to claim 7, wherein said valve-ventilation plug (36) further comprises means for discharging overpressure, preferably in form of one or more ventilation bores (43).

9. A valve unit (26) comprising:
a cartridge-and-valve-supporting unit (1), an inner housing (4), a pressure reducing valve unit (13, 14, 15, 16, 17, 18) and a cartridge protective housing (3), said cartridge-and-valve-supporting unit (1) supporting a gas cartridge (2),
said cartridge-and-valve-supporting unit (1) supporting said pressure reducing valve unit (13, 14, 15, 16, 17, 18), said cartridge-and-valve-supporting unit (1) comprising a connecting means (6) for connection with said cartridge protecting housing (3),
said cartridge-and-valve-supporting unit (1) comprising means (7) for sealing attachment of said cartridge-and-valve-supporting unit (1) into an opening (10) of a fluid container (11),
said cartridge-and-valve-supporting unit (1) comprising a lateral end-to-end opening (20), said inner housing (4) comprising an end-to-end opening (37), said inner housing (4) being supported in said cartridge-and-valve-supporting unit (1), such that rotation of said inner housing (4) within and relative to said cartridge-and-valve-supporting unit (1) effects an axial movement of said inner housing (4) out of an initial position into the direction of said cartridge protective housing (3) and into the direction of an opening (12) of said gas cartridge (2),
a tapping tip (8) being provided within said inner housing (4) on its end facing the cartridge protective housing (3), said pressure reducing valve unit (13, 14, 15, 16, 17, 18) being provided within said inner housing (4) on its end facing the cartridge protective housing (3), said tapping tip (8) and said pressure reducing valve unit (13, 14, 15, 16, 17, 18) each being rigidly attached to said inner housing (4), said pressure reducing valve unit (13, 14, 15, 16, 17, 18) comprising a pressure adjusting chamber (13), said pressure adjusting chamber (13) being in communication with said end to-end opening (37) of said inner housing (4), said end-to-end opening (37) ending against the wall of said cartridge-and-valve-supporting unit (1) in said initial position of said inner housing and being at least partly in communication with said opening (20) of said cartridge-and-valve-supporting unit (1) when said inner housing (4) has been moved axially such that said tapping tip (8) has tapped said cartridge (2).

10. The valve unit (26) according to claim 9, wherein said inner housing (4) is turnable and thus axially movable by a tapping lever (5), which is provided on a part of said valve unit directed to the outside of said fluid container.

11. The valve unit (26) according to claim 9, wherein said pressure regulating chamber (13) is axially defined by on the side of the said cartridge protective housing (3) by a tappet head (14) and on the opposing side by a membrane (15), the upper side of said tappet head (14) cooperating with an annular sealing face (17) thereby sealing the pressure adjusting chamber (13) against the pressure at said tapping tip (8), thereby providing a valve, said membrane (15) being biased onto a predetermined value against the pressure regulating chamber (13) by a spring (16), such that, when the pressure in said pressure regulating chamber (13) decreases under a predetermined value, a valve lifter (18) connected with said membrane (15) acts against and opens said valve (14, 17), until a sufficient amount of gas has entered said pressure adjusting chamber (13) for increasing the pressure in said pressure adjusting chamber (13).

12. The valve unit (26) according to claim 5 or 9, wherein the pressure acting from said membrane (15) in the direction of the cartridge-and-valve-supporting unit (1) is transferred via a regulator (21) onto said valve lifter (18), which acts against said tappet head (14), wherein said tappet head (14) is biased against said sealing surface (17) by a second spring (9).

13. The valve unit (26) according to claim 9, further comprising a safety valve (34), which is provided in such a manner, that gas can escape from the pressure regulating chamber (13) into the surrounding atmosphere, when the pressure in said pressure regulating chamber exceeds a predetermined value.

14. The valve unit (26) according to claim 13, wherein said safety valve (34) comprises a piston like extension in a membrane holding means (32) holding said membrane (15), said extension comprising a central bore (52) which is closed on the membrane-far front end and comprises lateral openings (24) near to said front end, said extension comprising a flexible hose (23), said hose (23) covering said piston like extension of said membrane holding means (32) in the area of said lateral openings (24), said central bore (52) being in communication with the pressure adjusting chamber (13) via openings (25) of small size.

15. The valve unit (26) according to claim 9, comprising means for locking said inner housing (4) in that position, in which it is disposed axially into the direction of the cartridge protective housing for such an extent, that said tapping tip (8) has tapped said gas cartridge (2).

16. The valve unit (26) according to claim 15, comprising a screw thread (6) for connection of said valve unit (1) with said cartridge protective housing (3).

17. A valve unit (26) comprising: a cartridge-and-valve-supporting unit (1), an inner housing (4), a pressure reducing valve unit (13, 14, 15, 16, 17, 18) and a cartridge protective housing (3), said cartridge-and-valve-supporting unit (1) supporting a gas cartridge (2), said cartridge-and-valve-supporting unit (1) supporting said pressure reducing valve unit (13, 14, 15, 16, 17, 18), said cartridge-and-valve-supporting unit (1) comprising a connecting means (6) for connection with said cartridge protecting housing (3), said cartridge-and-valve-supporting unit (1) comprising means (7) for sealing attachment of said cartridge-and-valve-supporting unit (1) into an opening (10) of a fluid container (11), said cartridge-and-valve-supporting unit (1) comprising a through-bore (20) defined within a wall of said cartridge-and-valve-supporting unit (1) and enclosed by a radially outwardly projecting cover wherein said through-bore (20) is in selective flow communication between (i) a pressure chamber (33) and (ii) an outside environment, said inner housing (4) comprising an end-to-end opening (37), said inner housing (4) being supported in said cartridge-and-valve-supporting unit (1), such that rotation of said inner housing (4) relative to said cartridge-and-valve-supporting unit (1) causes a corresponding axial movement of said inner housing (4) from an initial position in the direction of said cartridge protective housing (3) and into the direction of an opening (12) of said gas cartridge (2), a tapping tip (8) being provided within said inner housing (4) on its end facing the cartridge protective housing (3), said pressure reducing valve unit (13, 14, 15, 16, 17, 18) being provided within said inner housing (4) on its end facing the cartridge protective housing (3), said tapping tip (8) and said pressure reducing valve unit (13, 14, 15, 16, 17, 18) each being rigidly attached to said inner housing (4), said pressure reducing valve unit (13, 14, 15, 16, 17, 18) comprising a pressure adjusting chamber (13), said pressure adjusting chamber (13) being in communication with said end to-end opening (37) of said inner housing (4), said end-to-end opening (37) ending against the wall of said cartridge-and-valve-supporting unit (1) in said initial position of said inner housing and being at least partly in communication with said opening (20) of said cartridge-and-valve-supporting unit (1) when said inner housing (4) has been moved axially such that said tapping tip (8) has tapped said cartridge (2).

\* \* \* \* \*